June 3, 1930.  J. ZUBATY  1,761,950
SERVICE INDICATOR
Filed Feb. 14, 1927
Fig. 1.
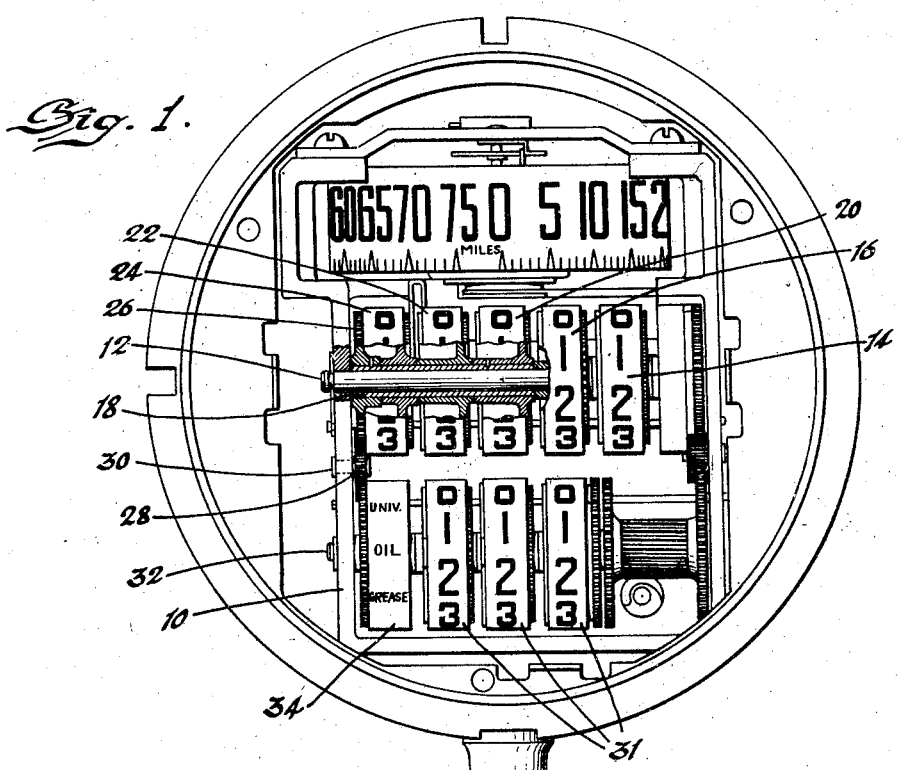
Fig. 2.
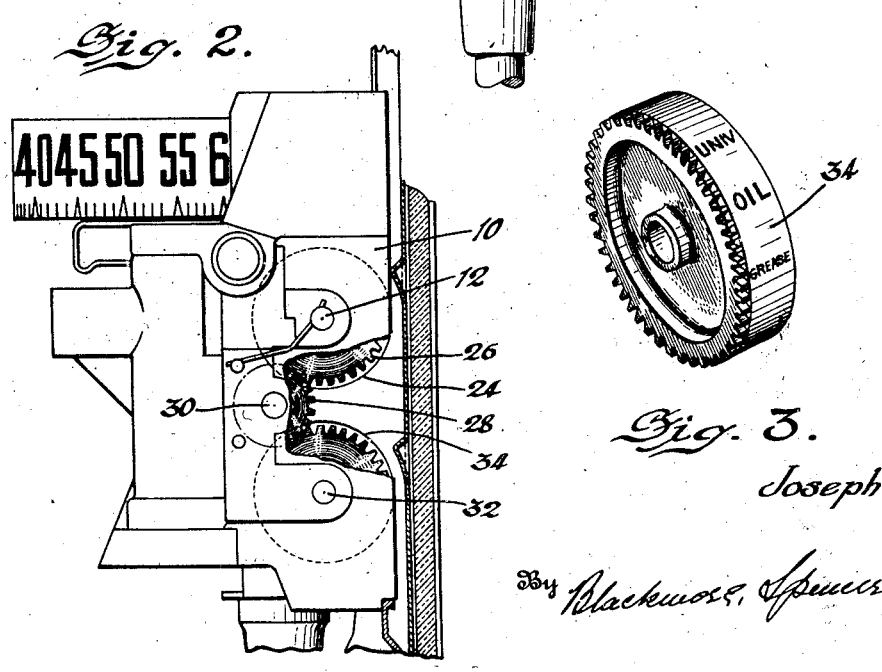
Fig. 3.
Inventor
Joseph Zubaty
By Blackmore, Spencer & Hub
Attorneys Patented June 3, 1930

1,761,950

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

SERVICE INDICATOR

Application filed February 14, 1927. Serial No. 168,068.

My invention relates to an indicating device to be used on motor vehicles for the purpose of automatically indicating when necessary lubricating or other service operations are to be performed.

It is essential that the various service operations to be performed on a vehicle, such as changing the crank case oil, lubricating the moving parts of the chassis, adding water to the battery, etc., should be done in relation to the number of miles traveled, rather than at any definite time intervals.

This invention has for its principal object the provision of indicating means inside the speedometer casing and operated by the odometer mechanism of the speedometer to show just what service operations should be performed when certain definite numbers of miles have been covered. This will obviate the necessity of the vehicle driver marking down or trying to remember the number of miles at which certain servicing was done.

Other advantages will be disclosed in the specification and accompanying drawing, in which:

Fig. 1 is a front view of a speedometer with the face plate removed, showing my improved service indicator.

Fig. 2 is a fragmentary side view taken from the left of Fig. 1.

Fig. 3 is a detail perspective view of the indicating wheel.

Mounted in the odometer frame 10 is a shaft 12 on which is journalled the units figure wheel 14 and the tens figure wheel 16 of the usual total mileage set of figure wheels. Rotatably mounted on the shaft 12 is a sleeve 18 to which is pinned or keyed the hundreds figure wheel 20. The thousands figure wheel 22 and the ten thousands figure wheel 24 are free to rotate upon the sleeve 18. Secured to the opposite end of sleeve 18 is a driving gear 26 which meshes with idler gear 28 supported on the frame 10 by stud 30.

Below the total mileage figure wheels the usual trip mileage figure wheels 31 are carried on the shaft 32. Wheels 31 may be driven in any suitable manner. I have shown conventional gearing for this purpose at the right of the figure. An indicating wheel 34 is rotatably mounted on this shaft independently of the trip mileage wheels, and is driven by idler gear 28. It will be seen that the wheel 34 will be rotated whenever the hundreds figure wheel 20 is rotated, as the two are directly connected by the sleeve 18 and gears 26 and 28.

On the indicating wheel 34 is a series of words or abbreviations of words such as Oil, Grease, Trans., Univ., Bat., etc. Thus, each time that the hundreds figure wheel 20 is rotated a tenth of a revolution, a different word will appear in the opening in the speedometer face plate through which the trip mileage figure wheels are visible. For example, if it is desired to change the crankcase oil every 500 miles, the word "Oil" would appear once for each half revolution. If oil should be added to the transmission each 1000 miles, the word "Trans." would appear once each revolution.

Due to the fact that the operation of my indicating means is entirely automatic, and is not subject to neglect by the driver, there is less likelihood of the various service operations being overlooked. As the service indicating wheel 34 is only advanced each 100 miles, the word indicating which service operation is next to be performed will be visible for the entire 100 miles.

While the indicating wheel may be mounted outside of the speedometer casing if desired it is preferably located inside of the casing as shown as it not only simplifies the construction of the speedometer but also permits a much more satisfactory installation and is more sightly than when mounted on the outside.

It is thought from the foregoing, taken in connection with the accompanying drawing, that the construction and operation of the device will be apparent to those skilled in the art, and that various changes in size, shape, and proportion and details of construction may be made without departing from the spirit and scope of the appended claims.

I claim:

1. An odometer comprising, in combination, a frame, a shaft carried by the frame, a sleeve rotatably mounted on the shaft, figure wheels carried on said shaft and other figures wheels carried on said sleeve, one of said figure wheels being secured to the sleeve, a gear secured to the sleeve, and a service indicating wheel carried by the frame and driven by said gear.

2. An odometer comprising, in combination, a frame, a shaft carried by the frame, a sleeve rotatably mounted on the shaft, total mileage figure wheels carried on said shaft and other total mileage figure wheels including a hundreds figure wheel carried on said sleeve, said hundreds figure wheel being secured to one end of said sleeve, a gear secured to the opposite end of said sleeve, a second shaft carried by said frame, and a service indicating wheel mounted on said second shaft and being driven by said gear.

3. An odometer comprising, in combination, a frame, a shaft carried by the frame, a sleeve rotatably mounted on the shaft, total mileage figure wheels carried on said shaft and other total mileage figure wheels including a hundreds figure wheel carried on said sleeve, said hundreds figure wheel being secured to one end of said sleeve, a gear secured to the opposite end of said sleeve, a second shaft carried by said frame and adapted to support trip mileage wheels, and a service indicating wheel mounted on said second shaft and driven by said gear.

4. In combination with an odometer having figure wheels, a shaft upon which said figure wheels are rotatably supported, a face plate having an opening therein through which the figure wheels are visible, and a service indicating wheel rotatably supported upon said shaft and visible through the opening in said face plate.

5. In combination with an odometer, having total and trip mileage figure wheels, a shaft upon which said trip mileage figure wheels are rotatably supported, a face plate having an opening therein through which the trip mileage figure wheels are visible, a service indicating wheel adapted to be driven by one of the total mileage figure wheels, said indicating wheel being rotatably supported upon said shaft and being visible through the opening in the face plate.

6. In combination with odometer mechanism having total and trip mileage figure wheels, a shaft upon which the trip mileage figure wheels are rotatably supported, a service indicating wheel rotatably supported on said shaft and adapted to be driven by one of said total mileage figure wheels.

In testimony whereof I affix my signature.

JOSEPH ZUBATY.